Feb. 25, 1958 D. B. NICHINSON ET AL 2,825,052
MECHANICALLY RESONANT SECTOR SCANNER
Filed June 20, 1946 3 Sheets-Sheet 1

INVENTORS
DAVID B. NICHINSON
WILLOUGHBY M. CADY

BY *M. C. Hayes*
ATTORNEY

Feb. 25, 1958     D. B. NICHINSON ET AL     2,825,052
MECHANICALLY RESONANT SECTOR SCANNER
Filed June 20, 1946     3 Sheets-Sheet 2

INVENTORS
DAVID B. NICHINSON
WILLOUGHBY M. CADY

BY *M. O. Hayes*
ATTORNEY

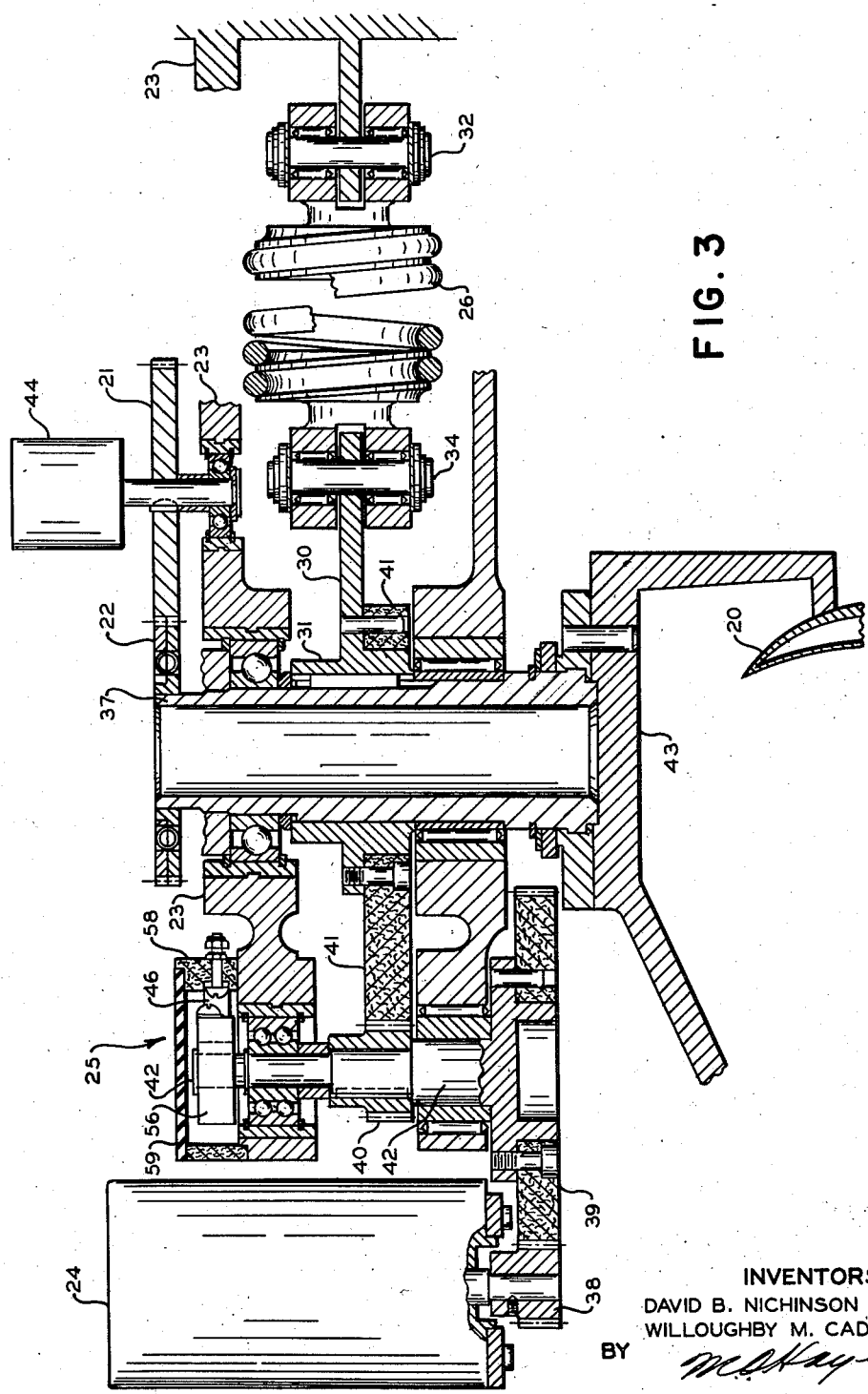

United States Patent Office

2,825,052
Patented Feb. 25, 1958

2,825,052

MECHANICALLY RESONANT SECTOR SCANNER

David B. Nichinson, Elmhurst, N. Y., and Willoughby M. Cady, Pasadena, Calif., assignors, by mesne assignments, to the United States of America as represented by the Secretary of the Navy Application June 20, 1946, Serial No. 678,030

7 Claims. (Cl. 340—765)

The present invention relates to antenna scanning systems and, more particularly, to antenna scanning systems which are mechanically resonant.

Rapid scanning has been found to improve markedly the oscilloscopic presentation of radar information. In conjunction with shorter pulse lengths and faster sweeps rapid scanning has not only made possible greater resolution, but has also enabled the use of short persistence screens. The ability to use short persistence screens and the ability to scan a target area rapidly have made possible the elimination of "information lag" in radar presentation, an important consideration in view of the increased speeds of aircraft. The speed and accuracy of fire control equipment are accordingly made much greater. Rapid scanning of small sectors has heretofore been successfully accomplished by both electrical and mechanical techniques. Two types of scanners employing rotating feeds and properly designed antenna reflectors have previously been designed to obtain desired sector scans. However one scanner permits only a 10 degree sector coverage and the other scanner is limited to approximately a 90 degree coverage. Both of these systems are capable of very high scan rates because of the simplicity of the revolving mechanism, but this advantage is for many applications outweighed by the fact that the nature of each system limits the sector coverage to a fixed angle whose previously indicated maximum value does not allow as inclusive a sector coverage as is often desirable. The development of the so-called "rocking horse" antenna has attempted to capture the end result of a rapid scan with a purely mechanical approach. This system employs an eccentric drive and a carefully balanced counter oscillating system which can scan very smoothly a sector of 15 degrees at a rate of about 10 times per second, but this, too, is a rather limited coverage. The next step in the development of rapid scanning of greater sectors was the use of multiple antennas employing a radio-frequency switching technique. The "back-to-back" scanner employs two antennas, mounted as the name implies, with a radio-frequency switch so designed as to permit scanning of a 165 degree sector, with one antenna on when the other is off. This same technique has been employed in mortar location scanners having four antennas, and a resultant sector coverage of 80 degrees was obtained. These systems are quite inflexible however, being fixed in their angles of coverage; and have the further disadvantage that their weights and bulks automatically exclude them from airborne use.

Accordingly, it is an object of this invention to provide a rapid-scanning antenna system.

Another object of this invention is to provide an antenna scanning system which is mechanically resonant.

Another object of this invention is to provide an antenna scanning system which allows flexibility in the choice of the region of and the width of the sector scanned by the antenna.

A still further object of this invention is to provide a rapid-scanning antenna system suitable for airborne installation.

These and other further objects will become more readily apparent upon recourse to the following description and the accompanying drawings of which:

Fig. 3 is a longitudinal sectional view taken along cutting plane III—III of Fig. 2.

Figures 1, 4:
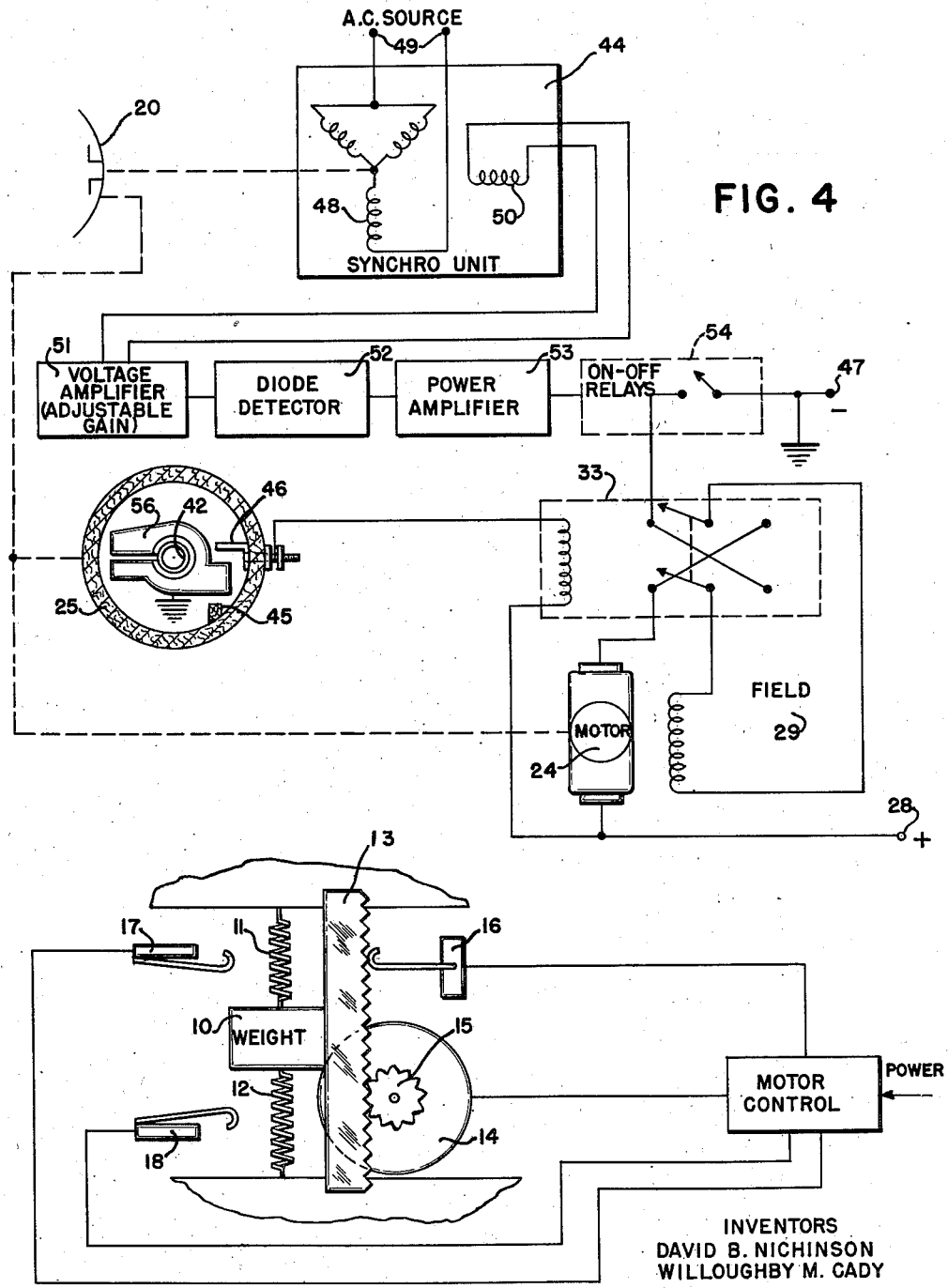
Fig. 1 is a simplified schematic representation of the invention.
Fig. 4 is a schematic diagram of the electrical constituents of the driving and control circuits.

In the mechanically resonant scanner (MRS) technique the scanner is a resonantly vibrating system in torsional oscillation. The antenna inertia is matched with springs of the proper characteristics so that the natural torsional frequency about the scan axis is that desired as the scanning frequency. Such a simple mass system in free torsional oscillation would in normal operation be damped out by the parasitic friction forces, and accordingly energy must be introduced to compensate for such dissipative forces if stable operation is to be maintained. A motor coupled to the oscillating system through a gear train having a ratio determined by the motor and the scanning characteristics could permit a periodic "kicking" to take place and act much the same as the "push" in maintaining the oscillation of the child on a swing. The magnitude and duration of the "kick" then determine the amplitude of the scan, since the energy introduced is actually transformed to an "equivalent" amplitude dissipating that same amount of energy in the same interval. Therefore, simply varying the "kick," a matter readily accomplished, gives this system the feature of variable sector coverage. The simplified schematic representation of Fig. 1 best illustrates the fundamentals of operation of the invention, the actual embodiment of which will be disclosed in further description and drawings. A weight 10 represents the actual mass of the reflector, feed, and supporting structure of an antenna plus the damping effects normally present in any antenna system. Weight 10 is supported by two helical tension springs 11 and 12 which would cause weight 10 to seek and assume a neutral position if not subjected to other force. Weight 10 is also attached to a rack 13 which is driven by a reversible motor 14 through a pinion 15. A velocity switch 16 is activated by rack 13 and will reverse motor 14 when the natural pull of helical tension springs 11 and 12 reverses the direction of oscillation of weight 10. Thus the "kick" provided by motor 14 is always in the proper direction, in unison with the natural motion of springs 11 and 12. Two amplitude switches 17 and 18, here shown as activated by weight 10, determines the duration of the "kick" given by motor 14, thus controlling the amplitude of oscillation by the previously mentioned equivalence of amplitude and motor energy delivered during the "kick." The rate of oscillation is controlled entirely by the resonant frequency of springs 11 and 12 and the inertia of their load, while the amplitude of oscillation is determined by equilibrium between the energy dissipated every half cycle and the energy introduced by motor 14.

Figure 2:
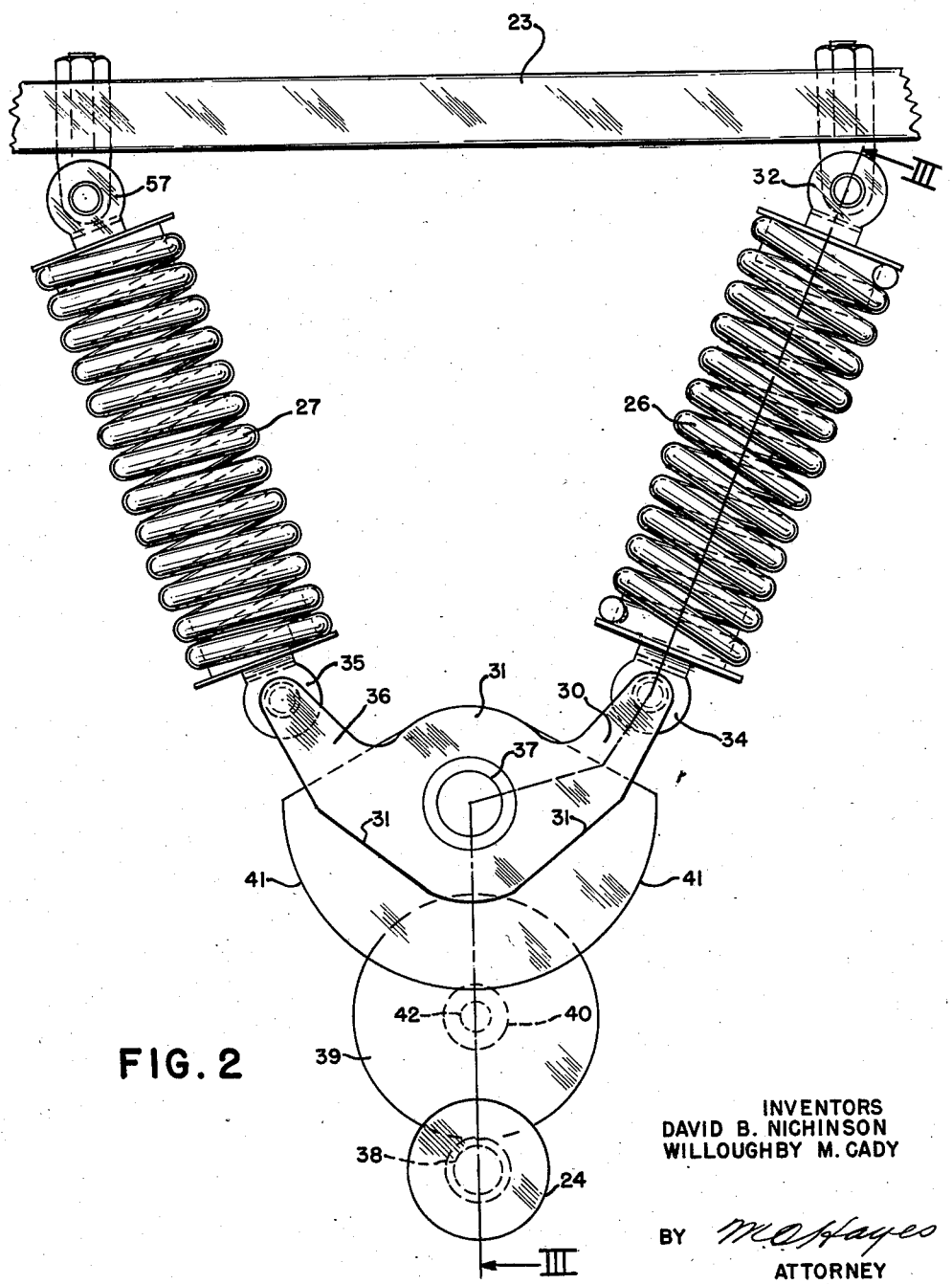
Fig. 2 is a partial plan view of an embodiment of the invention.

An actual embodiment of the invention, incorporating the fundamental concepts as just described, is represented in the partial plan view of Fig. 2 and reference is now made thereto. In this view a yoke-shaped crank structure 31 is shown with its associated arms 30 and 36 connected through two rotatable joints 34 and 35 to two helical tension springs 26 and 27 respectively. Helical tension spring 26 is connected to a mounting structure 23 through a rotatable joint 32. Spring 27 is similarly connected through rotatable joint 57. Crank structure 31 is splined or otherwise rigidly attached to a shaft 37, hereinafter referred to as a torque tube, which supports an antenna (not shown in this view). Also attached to torque tube 37 is a fiber sector gear 41 which engages another gear 40. Gear 40 is mounted on a shaft 42 which also bears a second fiber gear 39 which in turn is engaged by another gear 38. Gear 38 is attached to the shaft of a driving motor 24. Fig. 2 thus presents fundamental components which will comprise a mechanically resonant oscillating system if starting energy and energy to compensate dissipative losses are provided.

To give a more complete visualization of the system, a description will be given of Fig. 3 which is a cross sectional view of the embodiment as actually constructed. Here in more detail is presented the gear train linking motor 24 to torque tube 37. Shaft 42 in the middle left portion of the drawing supports fiber gear 39 driven by gear 38 which is connected to motor 24. Above gear 39, a smaller spur gear 40 secured to the same shaft drives a relatively large fiber sector gear 41 attached to torque tube 37. The velocity switch coupled to shaft 42 and generally indicated at 25 is more readily described, in conjunction with continued reference to Fig. 3, by a digression to Fig. 4 which shows a plan view of the switch. Velocity switch 25 includes a simple drag clamp 56 which will rotate with shaft 42 due to friction until brought against a fiber stop 45 or an electrical contact 46. The circular housing 58 of the switch is made of fiber for insulation, and the top is a transparent plastic plate 59. Returning to consideration of Fig. 3 alone, a split gear 22 is shown attached to the top of torque tube 37. A spur gear 21 mounted suitably on the shaft of self-synchronous data transmission means or synchro 44 engages split gear 22 which is "split" to prevent backlash in synchro information. The electric information from synchro 44 is utilized in the control of motor 24 in a manner to be disclosed hereinafter.

Fig. 4 illustrates the control features associated with motor 24. Velocity switch 25 mounted on shaft 42, as previously described, is therefore effectively coupled to antenna 20, as indicated by a broken line, and will thus cause, in one direction of rotation of antenna 20, contact to be made between drag clamp 56 and contact 46, while in the other direction of rotation, drag clamp 56 will come to rest against insulating stop 45 and consequently no electrical contact will be made. One lead of the actuating coil of a reversing relay 33 is connected to contact 46, and the other lead is connected to a source of voltage connected at 28. Reversing relay 33 has its center contacts connected to the leads of the field winding 29 of motor 24 which in this particular embodiment is a direct current series motor. Accordingly the other contacts of reversing relay 33 are effectively connected one pair to a negative source of voltage connected at 47 and the other pair through the armature winding of motor 24 to a positive source of voltage connected at 28. To control the point of application and the duration of the motor energy, synchro 44 has an alternating current source at 49 connected to its rotor windings 48 to generate a voltage output from its stator 50 which will be a function of the rotation of antenna 20, since rotor 48 is mechanically connected to antenna 20. This voltage varying with rotation is fed to an electronic control circuit generally comprising in this embodiment a voltage amplifier 51 of adjustable gain, a diode detector 52, a power amplifier 53, and a single-pole, single-throw relay 54. The actuating coil of relay 54 is part of the plate load of power amplifier 53 and makes or breaks contact between reversing relay 33 and the negative voltage source connected at 47.

The operation of this embodiment may be readily explained with reference to Fig. 4 bearing in mind of course the mechanical relationships developed in the figures heretofore presented. It is apparent that the basic structure of helical tension springs 26 and 27, crank structure 31, and torque tube 37 with its associated load comprise a system which will mechanically oscillate, given an impulse to overcome its inertia and subsequent energy to compensate for the friction and damping losses of the system. The control of energy insertion is accomplished by the electronic circuit of Fig. 4 which derives information from synchro unit 44. In general the operation of the control circuit is as follows: the stator output voltage is amplified, detected, and applied to power amplifier 53. Since the actuating coil of on-off relay 54 is incorporated in the plate circuit of amplifier 53, there will be definite values of input voltage to amplifier 53 at which relay 54 will "lock in" and "drop out." Since the input voltage of amplifier 53 is effectively a function of the rotation of antenna 20, a control mechanism is thus established which will disconnect motor 24 at defined limits of rotation, thereby effecting a control over the total amplitude of the mechanical oscillating system previously described. The adjustable gain of amplifier 51 allows a choice of the limits of rotation during which it is desired that motor energy be provided. A specific control circuit which not only performs this function but which also provides an electronic velocity switch which utilizes the 180 degrees phase shift feature which occurs when any synchro passes through its electrical center of rotation is more explicitly disclosed in the copending application entitled "Control Circuit," Serial No. 637,743, filed December 28, 1945, by Rudolph Sher, David B. Nichinson, and Clarence W. Schultz, now Patent No. 2,677,797. The control circuit of the present embodiment uses only the amplitude control feature of this co-pending application and relies on the mechanical velocity switch previously disclosed for reversing motor 24. Velocity switch 25 controls reversing relay 33 by merit of making contact between the actuating coil and ground through contact 46, clamp 56, and shaft 42 (which of course is at ground potential), thus activating reversing relay 33; or by not making contact and inactivating reversing relay 33. The correlation between rotation of antenna 20 and the direction of power applied to antenna 20 by motor 24 is thus established. The action of the controlling elements herein disclosed is thus seen to provide a desirable structure which enables the previously disclosed mechanically oscillating system to maintain a constant amplitude of oscillation which amplitude is subject to choice.

While the foregoing description has presented an explanation of this invention in the particular application of a mechanically resonant sector scanner the principles of this invention are of far broader application in ways which will be apparent to those versed in the art. Accordingly, it will be understood that the above-disclosed embodiment is primarily illustrative and the invention includes such other embodiments as fairly fall within the spirit and scope of the appended claims.

What is claimed is:

1. A mechanically resonant radar scanner comprising, a mounting structure, a source of voltage, a shaft supported in and free to oscillate within said mounting structure, an antenna to be rotated mounted on said shaft, a crank arm structure attached to said shaft, two springs each attached to one arm of said crank structure and to said mounting structure, a driving motor, a gear train mechanically coupling said driving motor to said shaft, a self-synchronous data transmission means geared to said shaft and connected to said voltage source, a control circuit suitably connected to said voltage source generally comprising a voltage amplifier which accepts the output of said self-synchronous means, a detector, a power amplifier, and a relay placed in circuit with said driving motor, a velocity switch, and a reversing relay controlled by said velocity switch and connected between the field of said driving motor and said voltage source; wherein said structure provides a rapidly oscillating scanner.

2. A mechanically resonant rapid scanning antenna comprising, a scanner, mechanically resonant members supporting said scanner, a driving motor connected to said scanner for imparting oscillation thereto, a self-synchronous generator mechanically driven by said scanner and providing an output voltage of amplitude varying with changes in the aiming of said scanner, means for detecting said output voltage, means for disconnecting power from said driving motor in response to predetermined values of said detected output voltage, means for reversing the rotation of said motor in response to changes of direction of oscillation of said scanner comprising, a rotary switch driven by said scanner and a reversing relay in circuit with the field coils of said driving motor, whereby said motor provides mechanical torque of proper direction to said scanner during predetermined excursions of said scanner from its rest position.

3. Apparatus as in claim 2 including an adjustable gain amplifier in circuit between said synchro generator and said detecting means for permitting manual variation of the duty cycle of said driving motor.

4. A mechanically resonant rapid scanning system for use with an antenna assembly having an antenna, a reflector and supporting structure comprising, in combination, spring means connected to said antenna assembly and permitting said assembly to oscillate about a neutral position, the resonant frequency of said spring means determining the frequency of oscillation of said assembly, motor means coupled to said assembly for supplying additional oscillatory energy thereto so as to compensate for the damping effects acting on said assembly, and means for rendering said motor means operative during a portion of each half cycle of oscillation whereby said antenna assembly is maintained oscillating at a predetermined constant amplitude.

5. A mechanically resonant rapid scanning arrangement for use with an antenna assembly including an antenna, a reflector and cooperating supporting apparatus comprising, in combination, spring means connected to said antenna assembly and permitting said assembly to oscillate about a neutral position, the resonant frequency of said spring means establishing the frequency of oscillation of said assembly, a reversible motor coupled to said assembly, and means for energizing said motor during each half cycle of oscillation of said assembly in a direction such as to add energy to the oscillating antenna assembly and for a variable time interval to control the sector through which said assembly sweeps.

6. A mechanically resonant rapid scanning arrangement for use with an antenna assembly having as constituent components an antenna, a reflector and cooperating structure for maintaining a fixed spatial relationship therebetween comprising, in combination, spring means coupled to said antenna assembly for oscillating said assembly about a neutral position, the natural resonant frequency of said spring means establishing the frequency of oscillation of said antenna assembly, a reversible motor also connected to said assembly, means for energizing said motor for a variable portion of each half cycle of oscillation of said antenna assembly, the direction of rotation of said motion being such as to add energy to the oscillating antenna assembly and the time of occurrence of said portion overlapping equally the time at which said assembly passes through said neutral point whereby the amplitude of oscillation of said assembly is maintained at a predetermined constant amount.

7. A mechanically resonant rapid scanning arrangement for use with an antenna assembly consisting of an antenna, a reflector, and cooperating supporting structure comprising, in combination, spring means connected to said antenna assembly for oscillating said assembly about a neutral position, the natural resonant frequency of said spring means establishing the frequency of oscillation of said assembly, a reversible motor also connected to said assembly, a signal generator driven by said antenna assembly, said signal generator producing an output signal whose amplitude is proportional to the angular displacement of said assembly from said neutral position, and means for energizing said motor when the amplitude of said signal is less than a predetermined magnitude whereby energy is added to said oscillating antenna assembly during the mid-portion of each half-cycle of oscillation of said assembly and whereby said assembly is maintained oscillating at a predetermined constant amplitude.

References Cited in the file of this patent
UNITED STATES PATENTS

| | | |
|---|---|---|
| 2,262,218 | Andrews | Nov. 11, 1941 |
| 2,408,825 | Varian et al. | Oct. 8, 1946 |
| 2,416,166 | Farrow | Feb. 18, 1947 |
| 2,422,180 | Broadbent | June 17, 1947 |
| 2,547,363 | Bishop | Apr. 3, 1951 |
| 2,713,121 | Lyman et al. | July 12, 1955 |